Dec. 8, 1953  R. R. KELLER  2,661,789
BONDING PRESS
Filed Feb. 14, 1951  4 Sheets-Sheet 3
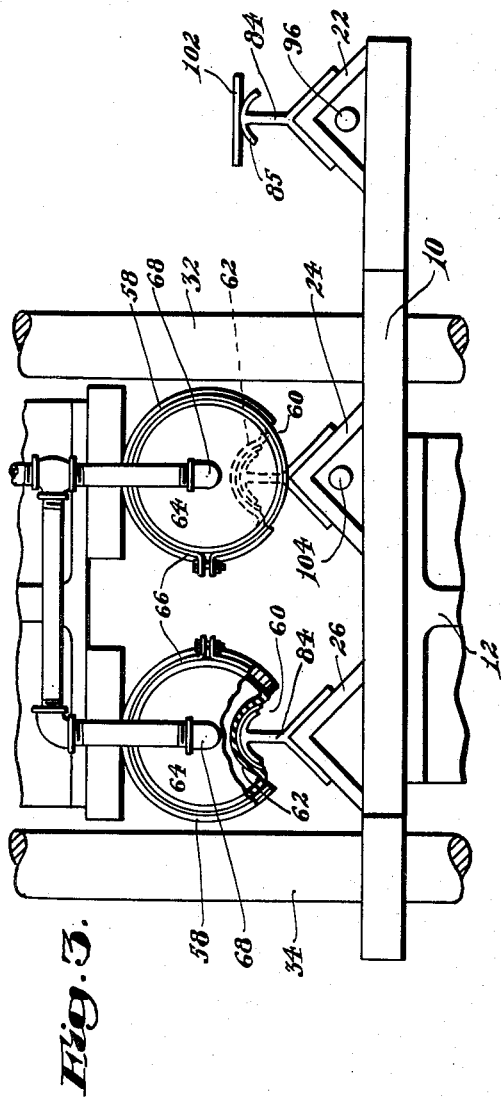
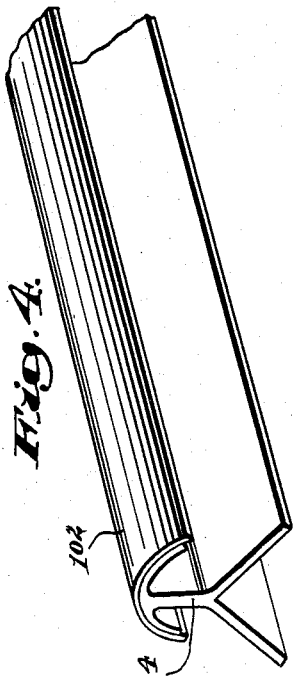
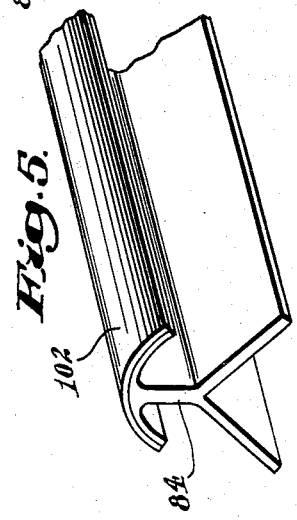

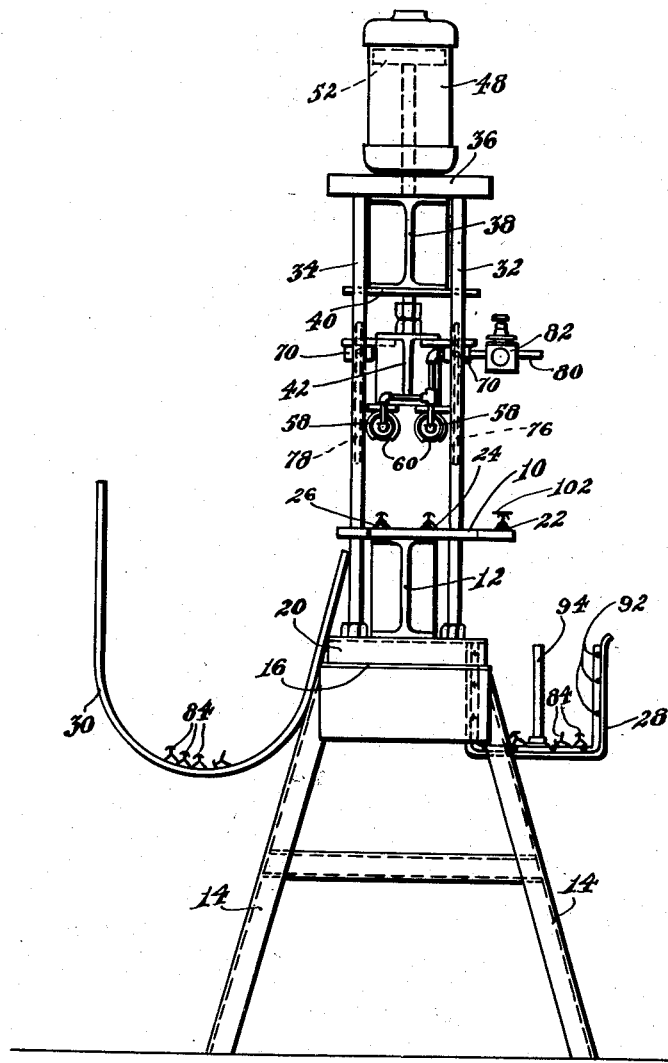

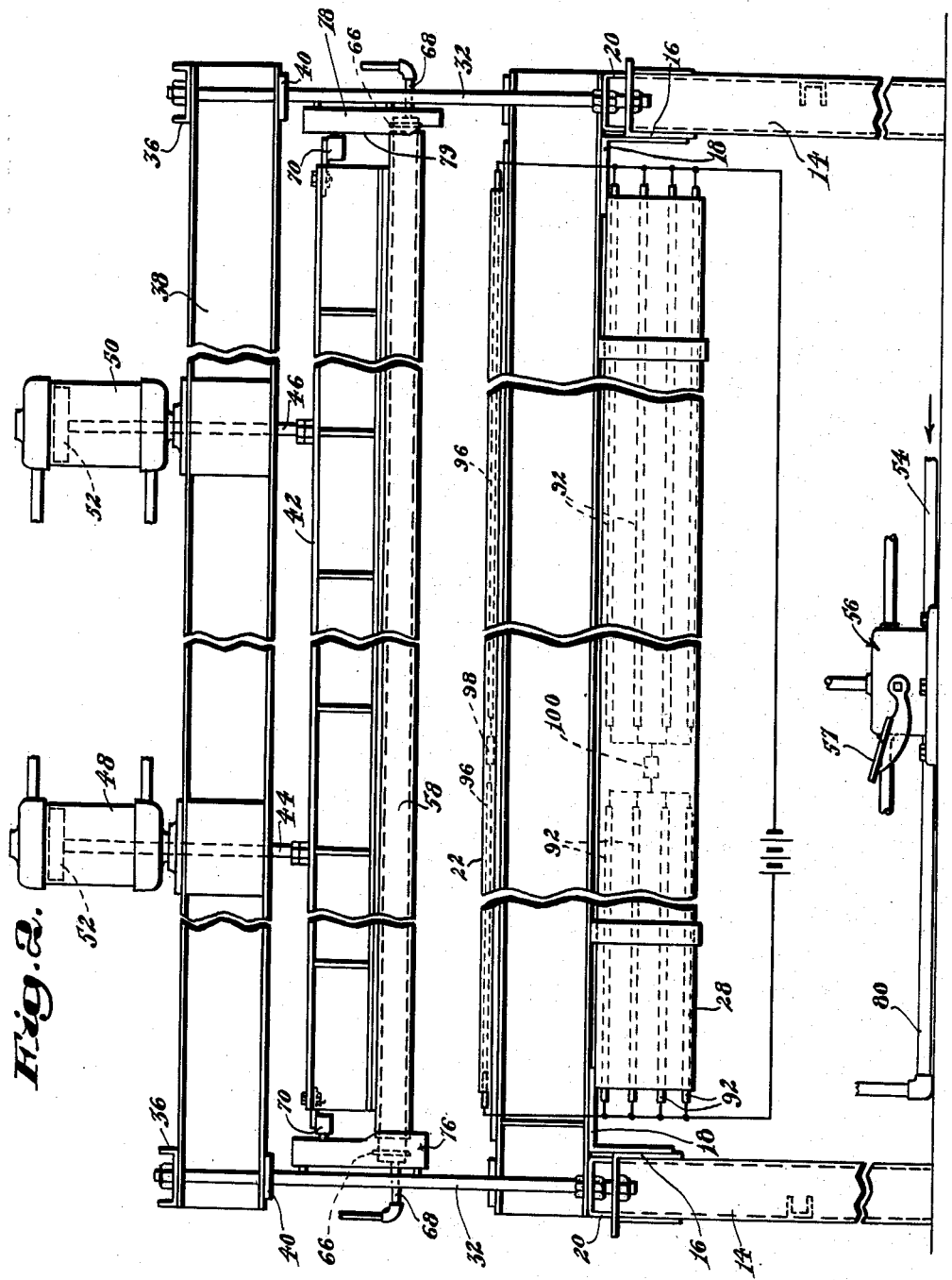

Dec. 8, 1953 — R. R. KELLER — 2,661,789
BONDING PRESS
Filed Feb. 14, 1951 — 4 Sheets-Sheet 4

Inventor:
Robert R. Keller
by John H. McKenna
Attorney

Patented Dec. 8, 1953

2,661,789

UNITED STATES PATENT OFFICE 2,661,789

BONDING PRESS

Robert R. Keller, Manchester, N. H.

Application February 14, 1951, Serial No. 210,892

8 Claims. (Cl. 154—1)

This invention relates to improvements in bonding presses, and more particularly to such presses of the general type suitable for pressing sheet elements and sheet materials into intimate covering relation to the surfaces of any of a variety of sheet elements or objects, and for effectively bonding the sheet elements and sheet materials to the covered surfaces. The sheet elements and sheet materials may be wood veneers, sheets of composition materials, or any of the numerous varieties of plastic sheets, for example, which may be applied and bonded, for example, to surfaces or surface portions of molding strips whose said surfaces or surface portions may be either plane, irregular or curved, or the covering sheets may be applied to any surface which it is desired to cover. The particular embodiment of the invention as herein disclosed is more especially designed for shaping and bonding relatively thin wood veneer strips to surface portions of metal molding strips for plywood panels and the like to provide veneer surface portions on the molding strips where they are to be exposed at juncture regions of panels and at exposed edges of panels. However, it should be understood that the invention is not limited to any specific branch of the pressure bonding art but has a broad field of utility in the pressure bonding art generally.

Heretofore, the bonding of relatively thin and fragile wood veneers to curved or irregular surfaces has presented real problems in that the veneers frequently become split or checked, especially in those cases where the veneers have to be shaped to conform to curved or irregular surfaces. Also, where such shaping of the veneers has been involved, the bond between a veneer and the covered surface has been difficult to attain with any degree of certainty that the bond would be permanently effective. If the veneer is to be applied to a metal molding strip, there has been the further problem of avoiding destruction or distortion of the molding strip under the force of the applied bonding pressure.

It is among the objects of the present invention to provide a bonding press wherein the bonding pressure is more effectively and uniformly applied and distributed throughout the area of a sheet element which is to be bonded to a plane, curved or irregular surface of a relatively rigid metal strip or the like, whereby the sheet element may be more effectively bonded to such a surface, as compared with prior bonding procedures, without rupture or disfigurement of the surface of the sheet element. According to the invention, the bonding pressure is applied to the sheet element through the medium of a pneumatic member having flexible walls which engage and conform to the surface contours of the sheet element as the latter is pressed into intimate covering relation to the surface to which it is being applied, the flexible walls of the pneumatic member being enclosed by rigid non-yielding walls excepting at a location where an opening is provided through the rigid walls for passage of the sheet element within the rigid walls into engagement with the flexible walls of the pneumatic member, the bonding being effected within the rigid wall enclosure, in the presence of heat, or not, as may be desired.

Another object of the invention is to provide a bonding press wherein a pneumatic member having flexible walls is enclosed within a casing having rigid, non-yielding walls, the enclosing casing having an opening therein for passage of the materials which are to be bonded together, said materials, with a suitable bonding agent associated therewith, being heated to a predetermined temperature and subjected to bonding pressure within said casing through the medium of said pneumatic member.

A further object is to provide a bonding press wherein a support for a work element to which a surfacing sheet is to be bonded has means associated therewith for heating the supported work element to a predetermined temperature whereby a dry glue coating on the surfacing sheet becomes tacky when placed in contact with the heated work element thereby to effect adherence together of the work element and sheet preliminarily to application of the bonding pressure thereto.

Still another object is to provide a bonding press wherein an inflatable bag is substantially enclosed within rigid walls through an opening in which the work to be acted upon enters into contact with the inflatable bag, the enclosed bag and the work being relatively movable toward each other, with means for automatically inflating and deflating the bag at a predetermined stage or at predetermined stages in the said relative movement.

Yet another object is to provide a bonding press wherein each of a pair of rigid tubes has an inflatable bag therein with an opening in each tube for entrance of work into engagement with the inflatable bag therein, one of said tubes having a work support for holding work to be acted upon by the inflatable bag in that tube, and having means for elevating the temperature of the work, and the other of said tubes having a work support for receiving work acted upon at said heated support and for holding it in position to be acted upon, in the absence of heat, by the inflatable bag in said other tube, whereby pressure bonding is effected at the heated work support, and setting of the bond is effected at the other support.

It is, moreover, my purpose and object generally to improve the structure and effectiveness of bonding presses, and more especially such presses for applying, shaping and bonding relatively thin surfacing sheets to plane, irregular or curved surfaces of molding strips, and the like.

In the accompanying drawings:

Fig. 1 is an end elevation of a bonding press embodying features of the invention;

Fig. 2 is a front elevation of the press shown in Fig. 1, with portions broken away;

Fig. 3 is a fragmentary end elevation of the work supports and pressure cylinders, on a larger scale;

Fig. 4 is a perspective of a short section of an outside corner molding strip having a veneer surfacing sheet bonded thereto in accordance with the invention;

Fig. 5 is a similar view showing a similar molding strip after the overhang of veneer has been trimmed away;

Figure 6:
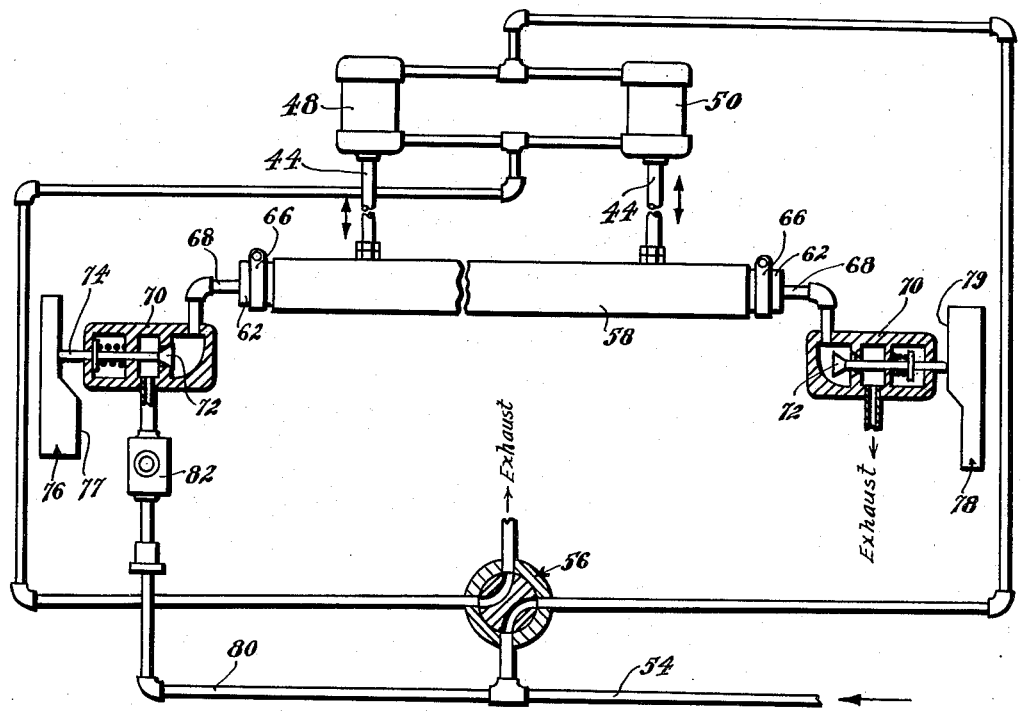
Fig. 6 is a diagrammatic view illustrating the fluid pressure control system.

Referring to the drawings, a table or platen 10 of any desired length is represented as mounted on the horizontally disposed I-beam 12 which latter is supported at its opposite ends by the legs 14. In the illustrated embodiment of the invention, a pair of legs 14 support each end of the I-beam 12, with the legs of each pair connected together at their upper ends by the angle iron cross-bars 16, 18, and with an inverted channel iron cross-bar 20 resting on each angle iron cross-bar 16 and directly engaging under the opposite ends of the I-beams.

Three work supports 22, 24 and 26 are secured in spaced longitudinal parallelism on table 10, extending approximately throughout the length of the press, and a work-holding trough 28 extends along the front side of the press, below the table 10, from which pieces or elements of work may be transferred to the work support 22. Another trough 30 extends along the rear side of the press into which finished pieces of work may be dropped following the final operation thereon.

A pair of guide posts 32, 34 extend in spaced parallelism vertically upward at the end locations of each of the pairs of legs 14, the lower ends of the posts being suitably secured to the cross-bars 16, 20 and the upper ends of each pair of posts being rigidly connected together by a channel cross-bar 36. A stationary I-beam 38 extends horizontally between the pairs of posts 32, 34, with its opposite ends rigidly secured between the posts of each pair, immediately under the channel cross-bars 36. A plate 40 is secured to the under side of I-beam 38 at each end thereof and each plate 40 has the adjacent posts 32, 34 extending therethrough and held thereby against relative displacement.

Operatively mounted below the I-beam 38, and between the pairs of posts 32, 34, is the shorter I-beam 42 which is fixed to the lower ends of the vertically movable piston rods or rams 44, 46 which have guided extent through the upper fixed I-beam 38. The upper ends of the piston rods or rams are within the cylinders 48, 50, respectively, which are fixed in position on the stationary I-beams 38, and each has a piston 52 fixed at its upper end and operable within its cylinder in response to differences in fluid pressure at the opposite sides of the pistons. Hence, when the cylinders 48, 50 are opened to exhaust at the upper side of the pistons and pressure fluid is admitted to the cylinders at the lower side of the pistons, the movable I-beam 42 will be elevated. When the cylinders are opened to exhaust at the lower side of the pistons, the I-beam 42 will drop by gravity, and its downward travel will be aided by admission of pressure fluid to the cylinders at the upper side of the pistons. Also, the admitted pressure fluid will hold the I-beam in its lowermost position during the process of pressure-shaping and bonding of the wood veneer or other sheet elements.

Referring more particularly to the diagrammatic showing of Fig. 6, pressure fluid in a conduit 54 leading from any suitable source may be directed to cylinders 48, 50, on either side of the pistons 52, selectively, by means of a suitable control valve 56 which is shown as a two way valve which, in the illustrated position, connects the pressure fluid supply to the upper ends of the cylinders while simultaneously connecting the lower ends of the cylinders to exhaust, or drain, and which, in its other position, connects the pressure fluid supply to the lower ends of the cylinders while simultaneously connecting the upper ends of the cylinders to exhaust, or drain. Any conventional means may be employed for operating valve 56, such as the treadle 57 shown in Fig. 2.

According to the invention, a rigid metal tube 58 is fixed on the lower side of movable I-beam 42, it being disposed horizontally and having length somewhat greater than the length of the I-beam 42, with its opposite ends projecting beyond the ends of the I-beam. A lower segment of the walls of tube 58 is cut away throughout the length of the tube to provide a substantial opening 60 (Fig. 3) into the interior of the tube. An air-tight flexible-walled tubular bag 62, which may be of rubber, is enclosed within the metal tube 58 and is adapted to be inflated and deflated in response to downward and upward movements of I-beam 42. In the illustrated embodiment, there are two of the metal tubes 58, with inflatable tubular bag 62 therein, one adapted to act on work on support 24 and the other adapted to act on work on support 26.

The end portions of the tubular bags 62 which project beyond the rigid metal tubes 58 conveniently may be sealed by a metal plug 64 in each end of the tubes, with a conventional hose clamp 66, or the like, clamping the bag walls to the plugs. However, each plug 64 has a pipe 68 opening through it, with the outer end of the pipe connected to a valve casing 70. There are two of the valve casings 70 of which one is supported on each end of the movable I-beam 42 for movement therewith.

As best seen in Fig. 6, each valve casing 70 has a normally closed valve 72 therein. The valve 72 at the left hand end of I-beam 42 in Fig. 2, and at the left in Fig. 6, controls flow of pressure fluid for inflation of the tubular bags 62, while valve 72 at the right hand end of I-beam 42 in Fig. 2, and at the right in Fig. 6, controls the exhaust from each bag.

In Figs. 2 and 6, the valves are shown in their positions when the movable I-beam 42 is at the upper limit of its travel (Fig. 2) or close to the upper limit (Fig. 6). Each valve 72 has a stem 74 projecting out of its casing, and the stem of the left hand valve is adapted to coact with a fixed cam 76 and the stem of the right hand valve is adapted to coact with a fixed cam 78. Cam 76 is mounted on one of the vertical posts 32 at the left hand end of the machine, and cam 78 is mounted on one of the vertical posts 32 at the right hand end of the machine. Cam 76 has its high portion 77 at the lower end of the cam and its low portion is opposite the adjacent valve stem 74 in Figs. 2 and 6, so that this left hand valve 72 is closed. Cam 78 has its high portion 79 at the upper end of the cam, opposite the adjacent valve stem 74 and acting on the stem to hold this right hand valve 72 open, in Figs. 2 and 6. Hence, both of the tubular bags 62 are open to exhaust or drain when the rigid tubes 58 are in elevated positions. As the rigid tubes 58 move downward toward work on the supports 24, 26, the right hand valve stem 74 rides from the high to the low portion of the right hand cam 78 thereby permitting the adjacent valve 72 to close. Simultaneously, or shortly thereafter, the left hand valve stem 74 rides from the low to the high portion of cam 76 thereby opening the adjacent valve 72 for admission of pressure fluid to the tubular bags 62. Pressure fluid from the source is directly connected to the left hand valve casing 70 through conduit 80 which may have a suitable pressure regulator 82 therein. All or a suitable portion of conduit 80 will be flexible to accommodate the vertical movements of the valve casing. Hence, as the rigid metal tubes 58 approach their lower limit of travel, the interior tubular bags 62 become automatically inflated. However, during the inflating process, the work to be acted upon will have entered through the bottom openings 60 of the rigid tubes into engagement with the bags 62, so that the bags, as they become inflated, effectively act on the work to apply needed shaping and bonding pressure to the veneer, or other surfacing sheet, which is being applied to a molding strip.

Fig. 3 illustrates the pressing and shaping action as a wood veneer strip is applied to a curved surface of an outside corner molding strip 84. Fig. 4 shows a portion of such an outside corner molding strip as it may appear after being acted upon by the press, and Fig. 5 shows a similar section after the overhang of the veneer has been trimmed away.

Figure 7:
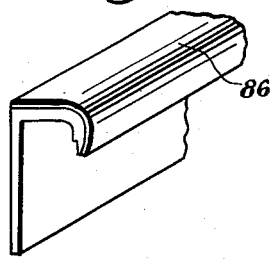
Figs. 7–9 are perspective views of fragments of various conventional molding strips with veneer applied to surfaces thereof in accordance with the invention.
Figure 8:
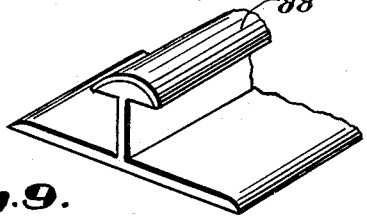
Figure 9:
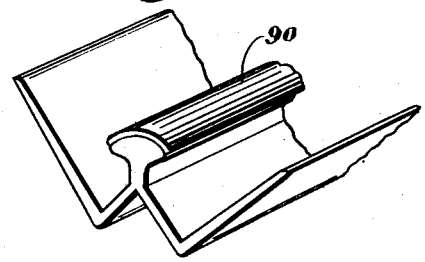

It should be understood that the work supports 22, 24 and 26 as herein shown are of shape for supporting outside corner molding strips of the general type best illustrated in Figs. 3-5, and that the illustrated supports are replaceable by supports of other shapes when other varieties of molding strips are to have wood veneer, or other surfacing sheets, applied thereto. For example, Figs. 7-9 illustrate fragments of other varieties of molding strips having wood veneer applied and bonded thereto. Fig. 7 is a fragment of a molding strip for an outside edge of a structural panel of plywood, or the like, with a wood veneer surfacing sheet applied at 86. Fig. 8 is a fragment of a molding strip for a line of juncture of two such panels in a common plane, with wood veneer applied at 88. Fig. 9 is a fragment of a molding strip for an inside corner, with wood veneer applied at 90.

Successful shaping and bonding of wood veneer, or other sheet material, to surfaces of molding strips, and the like, requires heat acting in conjunction with applied pressure.

According to the invention, the molding strips, or other work pieces, portions of which are to be surfaced with wood veneer, or other sheet material, are placed in the trough 28 at the front of the machine. The strips may be of any desired length, such as eight feet long, for example, and the trough 28 has heating means therein for heating the strips. Conveniently, the heating may be accomplished by commercially available electric "Calrod" heaters 92 suitably arranged within trough 28 with means for connecting all of the heaters to a suitable source of electricity. The strips become heated in trough 28 to a predetermined temperature which may approximate 250° F., for example. Preferably, the trough is divided longitudinally by a row of vertical posts 94 thereby to provide forward and rear trough sections in one of which newly inserted strips may be held and become heated while already heated strips are being withdrawn from the other trough section fro placement on the work support 22.

When a pre-heated molding strip, such as an outside corner molding strip 84, is removed from trough 28 and placed on support 22, as shown in Fig. 3, its temperature is further elevated a predetermined amount, such as to approximately 300° F., for example. Heating at support 22 may be accomplished in any suitable manner which conveniently may be by an electric "Calrod" heater 96 associated with the support 22. Thermostatic control means, indicated at 98 in Fig. 2, controls the temperature at the support 22, and similar thermostatic control means 100 controls the temperature in trough 28.

Referring now more particularly to Figs. 1 and 3, one of the pre-heated outside corner molding strips 84 from trough 28 is shown mounted on the support 22 with its curved portion 85 uppermost. A wood veneer strip 102, or other surfacing strip, taken from any convenient supply, is placed on the curved portion 85 of molding strip 84. The surfacing strips have a dried coating of glue on one side and the coated surface is placed in contact with the hot molding strip. Any suitable glue or cement may be applied to and dried on the wood veneer or other surfacing strips. Phenolic and urea resin glues and cements have been found satisfactory. Also resorcinol adhesives may be employed. As the temperature of the molding strip on support 22 becomes elevated, the glue at the region of engagement with the molding strip becomes tacky and the veneer strip becomes fairly strongly adhered to the molding strip, after which the molding strip, with the veneer strip 102 thereon, is transferred from support 22 to support 24. The molding strip on support 24 is again elevated in temperature, to approximately 320° F., for example, by means of an electric "Calrod" heater 104 associated with support 24, the temperature being controlled by a suitable thermostatic means similar to the control 98 at support 22.

The work on support 24 is now ready for application of the shaping and bonding pressure which is effected by lowering the stiff metal tubes 58 until the work enters the bottom opening 60 in that metal tube which is vertically aligned with support 24, followed by inflation of the flexible bag 62 within that tube. When the operator depresses treadle 57, treadle valve 56 (Fig. 6) is rotated to its position of Fig. 6 thereby to direct pressure fluid from conduit 54 into the cylinders 48, 50 at the upper sides of the pistons 52 therein while simultaneously opening these cylinders, at the lower sides of the pistons, to exhaust or drain. As the I-beam 42, and the carried rigid tubes 58, move downward, the right hand valve 72, which had been held open, rides from the high portion 79 of cam 78 to the low portion of the cam thereby permitting closing of the affected valve 72. Simultaneously, or a little later, the left hand valve 72, which had been closed, rides to the high portion 77 of cam 76 thereby opening the affected valve 72 and admitting pressure fluid to the tubular bags 62, and the bags become inflated and press the surfacing sheet 102 into intimate engagement with the curved top portion 85 of the molding strip 84 as the molding strip, and surfacing strip 102, enter within the rigid tube 58, as shown by dotted lines in Fig. 3. During the application of pressure, the glue on the under side of surfacing strip 102 will have been rendered tacky by the prevailing 320° F. temperature, and the combined action of the temperature and pressure results in an effective bonding of the surfacing strip 102 to the portion 85 of molding strip 84, with the strip 102 being smoothly shaped to conform to the exterior surface contour of the portion 85. Pressure of from ten to eighty pounds per square inch ordinarily will be found adequate for bonding thin wood veneer strips to metal molding strips. However, the magnitude of the pressure may be varied to suit particular conditions and requirements, and the invention is not limited in this respect.

The work may be held under pressure for any desired length of time by merely holding treadle 57 depressed. Upon release of the treadle, the treadle valve rotates to a position in which it opens the upper portions of cylinders 48, 50 to exhaust or drain and admits pressure fluid to the lower portions of the cylinders, whereby the I-beams 42 and the rigid tubes 58 are driven upwardly to their upper limit of travel with the stem of left hand valve 72 riding off the high portion of cam 76 to effect closing of the valve, and with the stem of right hand valve 72 riding onto the high portion of cam 78 to effect opening of the valve and deflation of bags 62.

It will be apparent from the foregoing description that the gas, or other fluid, in the bags 62, will become heated during each pressing coaction of the bags 62 with the work, and that the heated gas, or other fluid, is replaced by cool gas, or other fluid, during each cycle of the press. This tends to maintain the tubular bags 62 relatively cool, which prolongs their useful life.

In the particular press herein illustrated, the work is transferred from support 24 to the support 26 which latter has no heater associated with it. The rigid tube 58, and the bag 62 therein, which are vertically aligned with support 26, move in unison with the similar elements aligned with support 24, and the work on support 26 is subjected to pressure similar to what has been described in connection with support 24 but, at support 26, the pressure is applied in the absence of heat to effectively set the bond between the applied surfacing strip and the molding strip, after which the molding strip may be deposited in trough 30.

Usually there will be some overhang of the applied surfacing strip, and this preferably will be trimmed away to provide a finished molding strip as seen in Fig. 5.

It is intended that the patent shall cover, by suitable expression in the appended claims, whatever features of patentable novelty exist in the invention disclosed.

I claim as my invention:

1. In a press, a hollow cylindrical member having rigid side and end walls, an inflatable member having flexible walls enclosed and confined within said cylindrical member, said cylindrical member having an opening through its rigid side wall of width substantially less than the diameter of said cylindrical member for passage of work into its hollow and into engagement with said inflatable member therein, a work support opposite said opening in the walls of said cylindrical member, heating means associated with said work support for heating work mounted mounted on the work support, means for moving said cylindrical member and work support relatively toward and from each other for moving work on the work support into and out of the hollow of said cylindrical member, means responsive to a said movement of said cylindrical member and work support relatively toward each other for inflating said inflatable member while the heated work is within said hollow thereby to apply pressure to the work within the rigid confining walls of said cylindrical member by wrapping said inflatable member appreciably around the work in directions generally transversely of said cylindrical member, said opening in the walls of the cylindrical member having width only slightly more than the width of the work, whereby the work, when in said hollow, maintains the flexible walls of the said inflatable member against any appreciable inflation outwardly through said opening, and means for deflating said inflatable member in response to relative movement of said cylindrical member and work support from each other.

2. In a bonding press, a hollow cylindrical member having rigid side and end walls, an inflatable member having flexible elastic walls enclosed and confined within said cylindrical member, said cylindrical member having an opening through its rigid side wall of width substantially less than the diameter of said cylindrical member for passage of work into its hollow and into engagement with said inflatable member therein, a work support opposite said opening in the walls of said cylindrical member, means for moving said cylindrical member and work support relatively toward and from each other for moving work on the work support into and out of the hollow of said cylindrical member, and means at opposite end portions of said cylindrical member operative in response to relative movement of said cylindrical member and work support toward each other for inflating said inflatable member while the work is within said hollow thereby to apply pressure to the work within the rigid confining walls of said cylindrical member by wrapping said inflatable member appreciably around the work in directions generally transversely of the said cylindrical member, and operative in response to relative movement of said cylindrical member and work support from each other for deflating said cylindrical member.

3. In a press, a hollow cylindrical member having rigid side and end walls, an inflatable member having flexible walls enclosed and confined within said cylindrical member, said cylindrical member having an opening through its rigid side wall of width substantially less than the diameter of said cylindrical member for passage of work into its hollow and into engagement with said inflatable member therein, a first heated work support for holding an assembly of work elements which are to be bonded together by adhesive carried by at least one of the work elements, said work support being adapted to heat the supported assembly to a predetermined temperature, a second heated work support adjacent to the first and opposite said opening in the walls of said cylindrical member, said second work support being adapted to receive and hold a said heated assembly transferred thereto from the first work support and to elevate the temperature of the assembly a predetermined amount, means for moving said cylindrical member and said second work support relatively toward and from each other for moving the heated assembly of work elements on said second work support into and out of the hollow of said cylindrical member, and means for inflating said inflatable member in response to relative movement of said cylindrical member and second work support toward each other and while said work elements are within said hollow thereby to permanently bond together the work elements of the assembly by wrapping said inflatable member appreciably around the work in directions generally transversely of said cylindrical member.

4. In a bonding press, a pair of hollow cylindrical members having rigid side and end walls, an inflatable member having flexible walls enclosed and confined within each said cylindrical member, each said cylindrical member having an opening through its rigid side wall of width substantially less than the diameter of each of said cylindrical members for passage of an assemblage of work elements into its hollow and into engagement with the inflatable member therein, a separate work support opposite the said opening in the walls of each said cylindrical member, means for moving said cylindrical members and work supports relatively toward and from each other for moving an assembly of work elements on each of said work supports simultaneously into and simultaneously out of the hollows of the opposite cylindrical members, heating means for heating the assemblage of work elements on only one of said work supports to a predetermined temperature, and means responsive to a said relative movement of a said cylindrical member and work support toward each other for simultaneously inflating the inflatable members within the two cylindrical members while a heated assembly of work elements to be bonded together is within the hollow of one cylindrical member and while a relatively cool bonded assembly of work elements is within the hollow of the other cylindrical member, thereby to apply pressure to one assembly, in the presence of heat, by wrapping a said inflatable member appreciably around the assembly within the rigid confining walls of one cylindrical member, and to simultaneously apply pressure, substantially in absence of heat, to the other assembly within the rigid confining walls of the other cylindrical member by wrapping a said inflatable member appreciably around the assembly in directions generally transversely of the enclosing cylindrical member.

5. In a bonding press, a fixed approximately horizontal platen, a plurality of work supports on said platen, a container adjacent to said platen for holding elements of work, means for heating elements of work in said container to a predetermined temperature whereby an element of work may be removed from said container and placed on one of said work supports in a pre-heated condition whereby a work element from another source and having a dried coating of glue thereon becomes adhered to the pre-heated work element when placed thereon with the glue coating in contact with the pre-heated work element, the adhered together work elements being removable as a unit from said one work support for placement on a second one of said plurality of work supports, heating means for elevating the temperature of the work unit on said second work support to a predetermined relatively high temperature, a hollow cylindrical member having rigid side and end walls disposed opposite said second work support, an inflatable member having flexible walls enclosed and confined within said cylindrical member, said cylindrical member having an opening through its rigid side wall of width substantially less than the diameter of said cylindrical member for passage of a work unit into its hollow and into engagement with the inflatable member therein, means for moving said cylindrical member and said second work support relatively toward each other for projecting a heated work unit on the support through said opening into the hollow of said cylindrical member, and means responsive to a said relative movement of said cylindrical member and said second work support toward each other for inflating said inflatable member while said heated work unit is within the confines of the rigid walls of said cylindrical member thereby to apply bonding pressure to the work unit by wrapping the inflatable member appreciably around the work unit in directions generally transversely of the said cylindrical member in the presence of heat from the heated work unit.

6. In a bonding press, a fixed generally horizontal platen, a support movable vertically toward and from the platen, a plurality of hollow cylindrical members having rigid walls secured at the under side of said movable support, an inflatable member having flexible walls enclosed and confined within each said cylindrical member, a work support on said platen opposite each said cylindrical member, each said cylindrical member having an opening through its rigid walls whereby work on said work supports may be projected into the hollows of the cylindrical members when said movable support moves downwardly toward said platen, and means responsive to a said downward movement of said movable support for inflating said inflatable members while the work on the work supports is within the hollows of said cylindrical members, one of said work supports having heating means associated with it for heating the work thereon to a predetermined temperature whereby the work on this work support is acted upon by the inflatable member in one of the cylindrical members in the presence of heat, and work on the other work support being acted upon by the inflatable member in another of the cylindrical members substantially in absence of heat.

7. In a bonding press, first, second and third work supports, means for pre-heating work elements of one variety whereby a said pre-heated work element may be arranged on said first work support, means for elevating the temperature of a said pre-heated work element on said first work support whereby a work element of another variety and having a dry coating of glue thereon becomes adhered to said pre-heated work element when placed thereon with the glue in contact with the pre-heated work element preparatory to transfer of the assemblage of work elements to said second work support, a hollow cylindrical member opposite said second work support, said cylindrical member having rigid walls and having an opening through its walls for passage of a said assemblage of work elements on said second work support into its hollow, means for heating said assemblage on said second work support, an inflatable flexible walled member within said cylindrical member, means for moving said cylindrical member and second work support relatively toward each other for projecting a said assemblage of work elements on the second work support into the hollow of the cylindrical member, means responsive to a said relative movement of said cylindrical member and said second work support for inflating said inflatable member while said assemblage of work elements is within said hollow thereby to effect a permanent bond between the work elements of the assemblage preparatory to transfer of the assemblage to said third work support, and means for applying pressure to said assemblage on said third work support substantially in absence of heat.

8. In a press, a generally hollow cylindrical member having rigid side and end walls, an inflatable member having flexible walls enclosed and confined within said hollow member, said hollow member having an opening through its rigid side wall of width substantially less than the diameter of said generally cylindrical member for passage of work into the hollow of the hollow member and into engagement with said inflatable member therein, a work support opposite said opening in the walls of the hollow member, means for moving said hollow member and work support relatively toward and from each other for projecting work on the work support through said opening into the hollow of said hollow member and for withdrawing the work out of the hollow of said hollow member, and means responsive to a said movement of said hollow member and work support relatively toward each other for inflating said inflatable member while the work is within the hollow of said hollow member thereby to apply pressure to the work within the rigid confining walls of said hollow member while said inflatable member becomes wrapped appreciably around the work in directions generally transversely of said hollow member.

ROBERT R. KELLER.

References Cited in the file of this patent
UNITED STATES PATENTS

| Number | Name | Date |
|---|---|---|
| 2,407,528 | Antonson | Sept. 10, 1946 |
| 2,519,661 | Johnson | Aug. 22, 1950 |
| 2,524,932 | Schulman | Oct. 10, 1950 |